(12) United States Patent
Loveless et al.

(10) Patent No.: US 8,454,340 B1
(45) Date of Patent: Jun. 4, 2013

(54) HEAT TREATED FORMATION OF TUBULAR ARTICLES

(75) Inventors: Don L. Loveless, Sterling Heights, MI (US); Valery I. Rudnev, Rochester Hills, MI (US); John Justin Mortimer, Genesee, WI (US); Brian R. Gramoll, Sussex, WI (US)

(73) Assignee: Radyne Corporation, Milwaukee, WI (US)

( * ) Notice: Subject to any disclaimer, the term of this patent is extended or adjusted under 35 U.S.C. 154(b) by 1106 days.

(21) Appl. No.: 12/411,246

(22) Filed: Mar. 25, 2009

Related U.S. Application Data

(60) Provisional application No. 61/039,115, filed on Mar. 25, 2008.

(51) Int. Cl.
*B29C 33/02* (2006.01)

(52) U.S. Cl.
USPC ......... 425/174.6; 219/535; 425/384; 425/392

(58) Field of Classification Search
USPC ........... 425/174.6, 384, 392; 249/78; 219/535
See application file for complete search history.

(56) References Cited

U.S. PATENT DOCUMENTS

| | | | | |
|---|---|---|---|---|
| 1,592,975 | A * | 7/1926 | Hearne | 219/244 |
| 3,201,558 | A * | 8/1965 | Lusebrink | 219/619 |
| 3,471,683 | A * | 10/1969 | Bogue | 219/469 |
| 3,682,775 | A * | 8/1972 | Grosse | 376/306 |
| 4,200,784 | A * | 4/1980 | Albaric et al. | 219/470 |
| 4,820,904 | A * | 4/1989 | Urban | 219/216 |
| 5,176,866 | A * | 1/1993 | Tanaka et al. | 264/219 |
| 7,128,558 | B2 * | 10/2006 | Lum et al. | 425/326.1 |

* cited by examiner

*Primary Examiner* — Robert B Davis
(74) *Attorney, Agent, or Firm* — Philip O. Post

(57) ABSTRACT

Apparatus and method are provided for heat treatment of a tubular preform material that is loaded onto the outer surface of an electrically conductive mandrel forming a rotatable tubular shaped resistance heater.

15 Claims, 5 Drawing Sheets

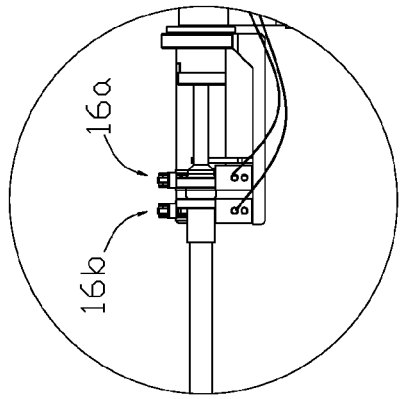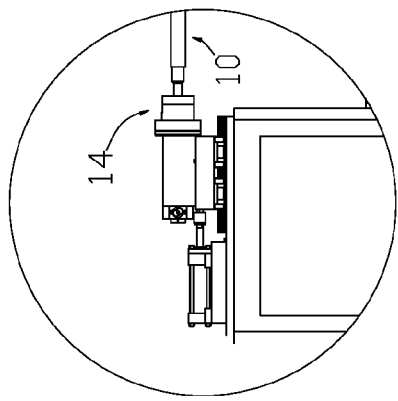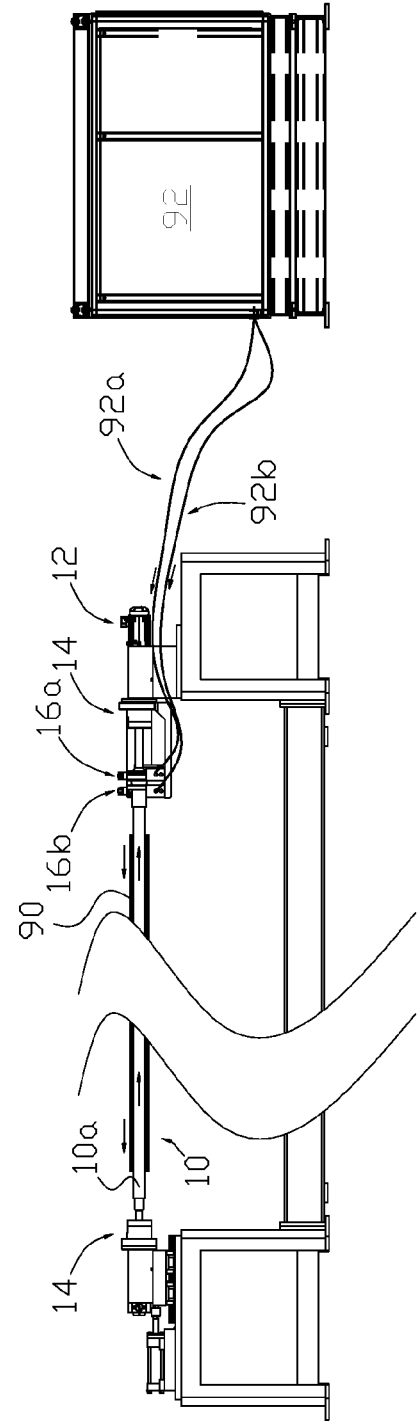

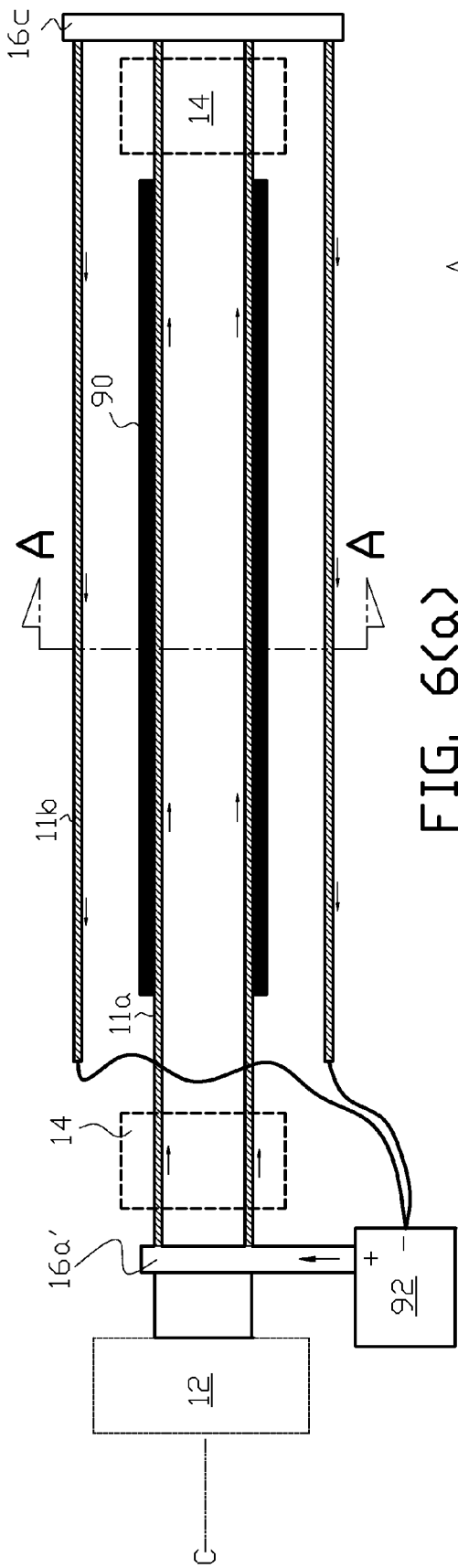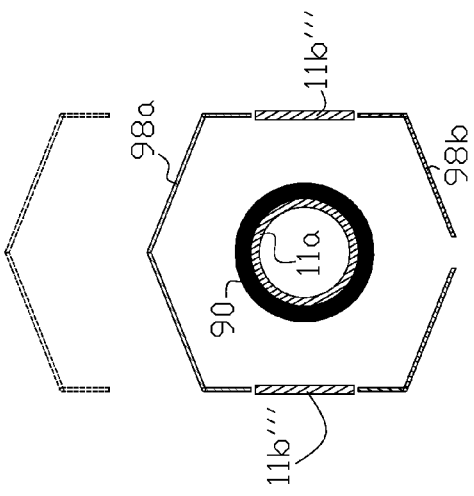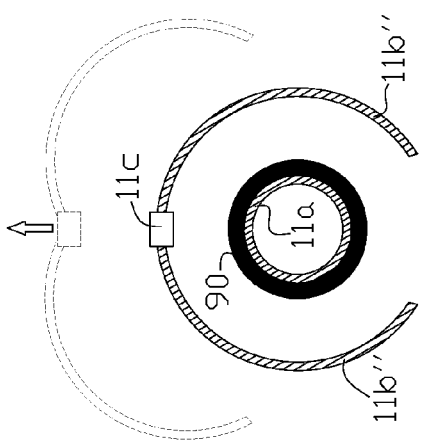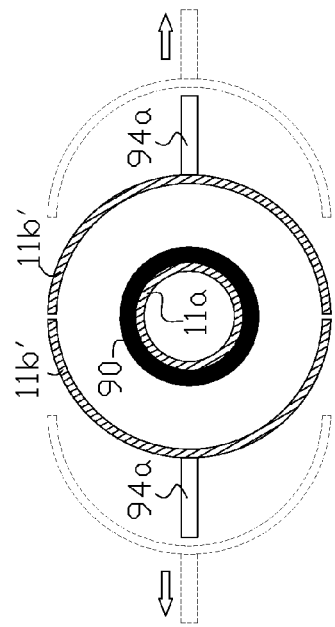

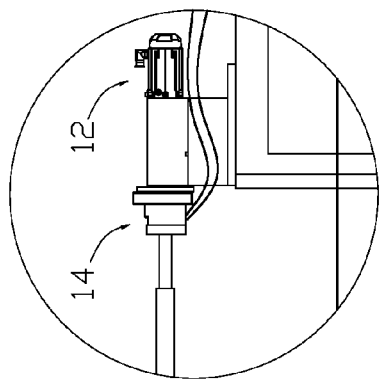
FIG. 7(b)
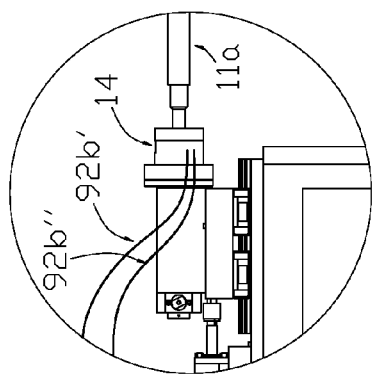
FIG. 7(c)
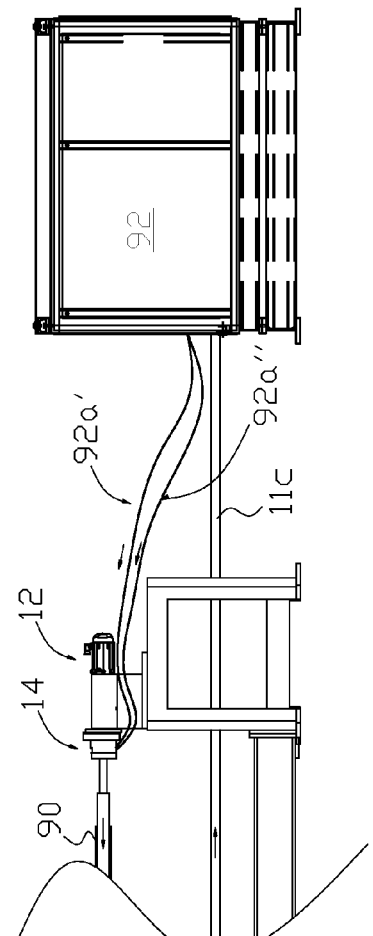
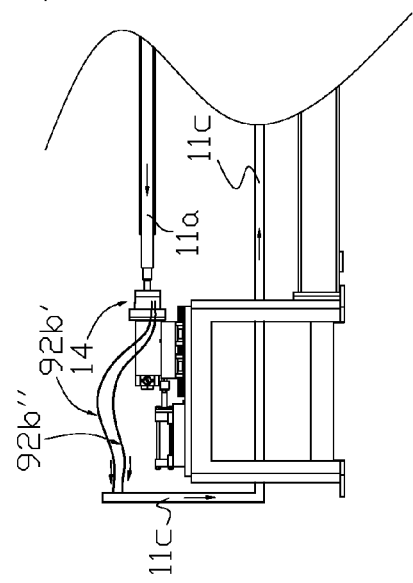
FIG. 7(a)

HEAT TREATED FORMATION OF TUBULAR ARTICLES

CROSS-REFERENCE TO RELATED APPLICATIONS

This application claims the benefit of U.S. Provisional Application No. 61/039,115, filed Mar. 25, 2008, hereby incorporated by reference in its entirety.

FIELD OF THE INVENTION

The present invention relates to heat treatment of a tubular preform placed on a mandrel to form a heat-treated tubular article.

BACKGROUND OF THE INVENTION

A tubular article, such as electrical insulation tubing, can be formed by heat treatment of a preform of the article. The tubular article can be formed, for example, from a thermosetting plastic preform that is molded into a final article by heat curing. The preform may be a single constituent material or a composite of constituent materials. The single constituent material, or composite of constituent materials, may be electrically conductive or non-electrically conductive. Composite materials can include, for example, powered particles mixed in a binder, a fiber reinforced composite or a discrete multi-layered composite that may include a mix of electrically conductive and non-electrically conductive layers. Alternatively the preform may be heat treated to form an adhesive that is subsequently applied to another material.

A tubular mandrel may be used in heating systems for curing or drying a preform loaded onto the outer surface of the mandrel. Mandrels can vary significantly in size, for example, from the size of a thin needle to eight inches in diameter and twenty feet in length. One type of known heating system for heat curing (or drying) a preform is a tubular mandrel and a hot fluid medium such as a heated liquid (for example steam), thermal oil or polymer that flows inside of the tubular mandrel to heat the mandrel, which, in turn, heats by conduction, the preform loaded on the outside surface of the mandrel. After a substantial amount of the hot medium flows through the tubular mandrel there can be an appreciable deflection of the mandrel. This deflection may be as much as five to seven inches and can result in shape distortion. In order to compensate for the effects of gravity and provide a high quality tubular product with a consistent wall thickness, the mandrel can be rotated. Circulating a large volume of a hot fluid medium through the tubular mandrel presents safety concerns; raises obvious maintenance issues (for example leakage of the hot fluid); and makes the entire curing or heating system cumbersome.

Another type of known heating system for curing or drying a preform comprises an electric induction scanner with an induction coil that surrounds the preform on the mandrel and inductively heats a metallic mandrel by induced eddy current. However axial deflection (wobbling) of the mandrel during rotation requires an appreciable "coil surface to mandrel surface" gap that negatively affects the electrical efficiency of the induction heating system, as well as resulting in poor product quality and process sensitivity.

One object of the present invention is uniformly and efficiently heat treating a tubular shaped preform by resistively heating a longitudinally oriented electrical conductor upon which the tubular preform has been loaded.

Another object of the present invention is to improve the robustness and safety of equipment for heating tubular shaped preforms and articles formed therefrom.

Another object of the present invention is to avoid generating stray electromagnetic and electrostatic fields resulting from application of electrical energy for resistance heating of the mandrel.

SUMMARY OF THE INVENTION

In one aspect the present invention is apparatus for, and method of, heat treating a tubular preform. An outer longitudinally oriented first electrical conductor has an at least partially open interior. The outer longitudinally oriented first electrical conductor has a first end, and a second opposing end. The outer surface of the outer longitudinally oriented first electrical conductor forms a mandrel surface on which the tubular preform is loaded. An inner longitudinally oriented second electrical conductor is disposed within the outer longitudinally oriented first electrical conductor. The inner longitudinally oriented second electrical conductor has a first end and a second opposing end. The first adjacent ends of the outer and inner longitudinally oriented first and second electrical conductors are suitably connected together to form a series electrical resistance. A rotational support structure is used to support the opposing ends of the assembled outer and inner longitudinally oriented first and second electrical conductors. An electric power supply with first and second power supply outputs has its outputs connected across the second opposing ends of the outer and inner longitudinally oriented first and second electrical conductors. A rotational driver is suitably attached to either the outer or inner longitudinally oriented first or second electrical conductor so that the loaded preform can be selectively rotated.

In another aspect the present invention is apparatus for, and method of, heat treating a tubular preform. A longitudinally oriented electrical conductor has a first end and an opposing second end. The outer surface of the longitudinally oriented electrical conductor forms a mandrel surface on which the tubular preform is loaded. At least one return electrical conductor is located external to the longitudinally oriented electrical conductor. A first end of the at least one return electrical conductor is connected to the first end of the longitudinally oriented electrical conductor to form a series electrical resistance between the second ends of the longitudinally oriented electrical conductor and the at least one return electrical conductor. A rotational support structure is used to support the opposing ends of the longitudinally oriented electrical conductor. An electric power supply has first and second power supply outputs with the first power supply output connected near to the second end of the longitudinally oriented electrical conductor, and the second power supply output connected to the second end of the at least one return electrical conductor. A rotational driver is attached to the longitudinally oriented electrical conductor to selectively rotate the mandrel surface.

In another aspect the present invention is a method of heat treating a tubular preform. The tubular preform is deposited on a mandrel surface formed from the outer surface of an outer longitudinally oriented first electrical conductor that has at least a partially open interior in which an inner longitudinally oriented second electrical conductor is positioned. The first adjacent ends of the outer and inner longitudinally oriented first and second electrical conductors are electrically connected together to form a series connected resistance between their second opposing ends. The opposing ends of the loaded mandrel are attached to a rotational support structure, and the loaded mandrel is connected to an electric power supply so that the output current of the power supply flows serially through the outer and inner longitudinally oriented electrical conductors to resistively heat the outer longitudinally oriented first electrical conductor while the loaded mandrel can be selectively rotated.

The above and other aspects of the invention are further set forth in this specification and the appended claims.

BRIEF DESCRIPTION OF THE DRAWINGS

For the purpose of illustrating the invention, there is shown in the drawings a form, which is presently preferred. It being understood, however, that this invention is not limited to the precise arrangements and instrumentalities shown.

FIG. 5(a) through FIG. 5(c) illustrate one non-limiting example of the present invention.

FIG. 6(a) illustrates another example of the present invention wherein an outer electrical conductor at least partially surrounds a mandrel electrical conductor upon which the preform of an article is placed.

FIG. 6(b), FIG. 6(c) and FIG. 6(d) illustrate in cross section through line A-A in FIG. 6(a) alternative non-limiting examples of the arrangement of the outer electrical conductor used with the example of the present invention shown in FIG. 6(a).

FIG. 7(a) through FIG. 7(c) illustrate another non-limiting examples of the present invention.

DETAILED DESCRIPTION OF THE INVENTION

Figure 1:
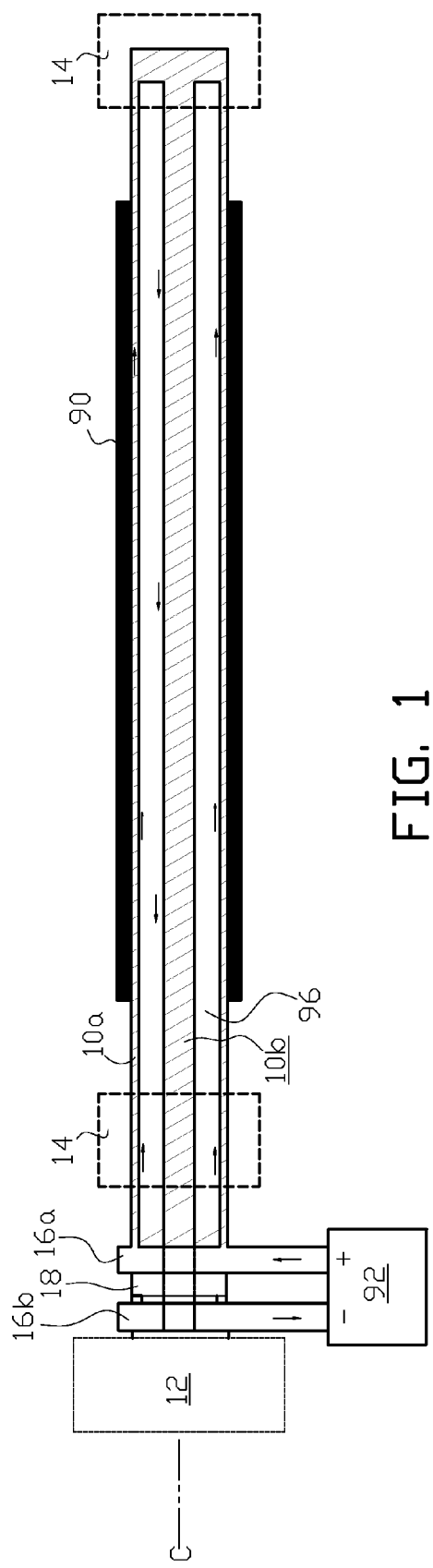
FIG. 1 is a simplified partial cross sectional and diagrammatic arrangement of one example of the tubular shaped preform heating apparatus of the present invention.
Figure 2:
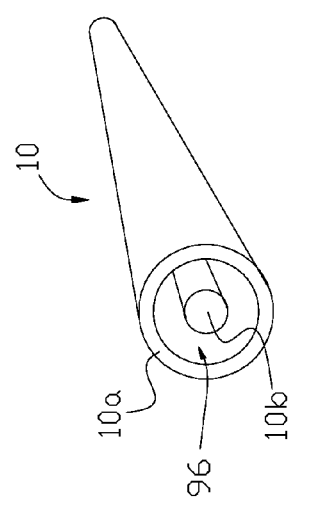
FIG. 2 is a simplified isometric of one example of a mandrel resistive heater used in the heating apparatus shown in FIG. 1.

There is shown in FIG. 1 and FIG. 2 one example of an apparatus for heat treated formation of tubular articles of the present invention comprising a tubular shaped center return heater. The heater comprises tubular electrical apparatus 10 (mandrel) consisting of longitudinally oriented outer electrical conductor 10a and longitudinally oriented inner electrical conductor 10b. In some examples of the invention, the outer and inner conductors of electrical apparatus 10 may be machined from a solid block of any suitable electrically conductive material. In other examples of the invention, the inner and outer conductors may be formed from different materials and suitably joined together. By way of example and not limitation, in some examples of the invention, it is preferable that outer conductor 10a comprises a material exhibiting a relatively high electrical resistivity (greater than about 100 nano-ohm-meters) and the inner conductor 10b comprises a material exhibiting a relatively low electrical resistance (less than about 30 nano-ohm-meters) to increase electrical efficiency of the heating system. In such examples, a carbon steel, a stainless steel, titanium, or alloys thereof, or a nickel-chromium alloy such as INCONEL, is suitable for the outer conductor, and copper, silver or aluminum, or alloys thereof, are suitable for the inner conductor. Space 96 formed between the inner and outer conductors may optionally be filled with an electrically non-conductive material such as a thermal insulator. While outer conductor 10a is shown in the shape of a hollow cylinder, the outer conductor may be formed in other longitudinally oriented shapes depending upon the shape of the tubular preform. For example if the tubular preform is more generally in the form of an elongated hollow square, then at least the outside shape of the outer conductor can be formed in an elongated square shape.

Alternatively electrical apparatus 10 may comprise discreet conductors, such as wires, tubes or sheets, embedded in an electrically non-conductive material. Litz wire may also be used as inner conductor 10b in some examples of the invention.

If necessary for rapid transition from heating to cooling of the preform material, upon completion of heating of the material on the mandrel, space 96 between the inner and outer conductors may be filled with a cooling medium, such as, for example, a cooling gas or liquid. In some examples of the invention further appropriate cooling passages, for example, in the conductors may be provided.

A single-phase source 92 of electric power, either alternating current (ac) or direct current (dc) is applied at suitable connection points to the inner and outer electrical conductors. In FIG. 1 a power source is indicated with the negative polarity of the source's output connected to inner conductor 10b and the positive polarity of the source's output connected to outer conductor 10b, with arrows adjacent to a conductor indicating direction of current flow through the conductor. If the source is an ac source, then the polarity indicates an instantaneous current polarity through the conductors. In other examples of the invention, if the source is a dc current source, polarity of the source connections may be reversed between the inner and outer conductors. If the source is an ac source, any suitable frequency may be used. Further the output of the power source may utilize pulse width modulation and/or duty cycle regulation to achieve a particular heating profile of the preform.

Generally apparatus 10 may be unidirectionally rotated about its central axis C, or alternatively it may be bi-directionally rotated in a reverse rotation, or oscillatory rotational motion at least for some time period during the formation by heat treatment of the preform material 90 placed on the outer surface of the mandrel that represents a heating element. Preferably, but not by way of limitation, a rotational driver, such as electric motor 12 is attached at, or near to, the extended end of the heating apparatus as shown in the FIG. 1. The rotational driver is suitably connected to the outer conductor so that the tubular shaped heating apparatus can be rotated; in other examples of the invention the rotational driver may be attached to the inner conductor. A chuck (collet) and bearing assembly 14 is attached to each end of apparatus 10 to form a rotational support structure. Suitable electrical insulation is provided between apparatus 10 and assemblies 12 and 14, or between assemblies 12 and 14 and electrical ground potential. The mechanical interfaces with the mandrel are arranged to provide removal and insertion of a mandrel. In some applications of the invention, the mandrel may be automatically loaded or unloaded from its support structure, for example, by a robotic device; in these applications, electric motor 12 may be replaced by, or supplemented with, a servomechanism or servomotor to accurately return the mandrel to a "home" load or unload position so that the robotic device can repeatedly load or unload a mandrel.

Slip rings 16a and 16b, or another form of electrical rotating assembly utilizing, for example, brush or clamp assemblies, are used to supply dc or ac power to apparatus 10.

In other examples of the invention where oscillatory rotation can be used instead of continuous unidirectional rotation, cables from the power source may be fixed to the input ends of the tubular shaped heating apparatus. As rotation occurs in one direction, the cables payout and wrap around a reel associated with the heating element and payback when the rotation is reversed.

Figure 3:
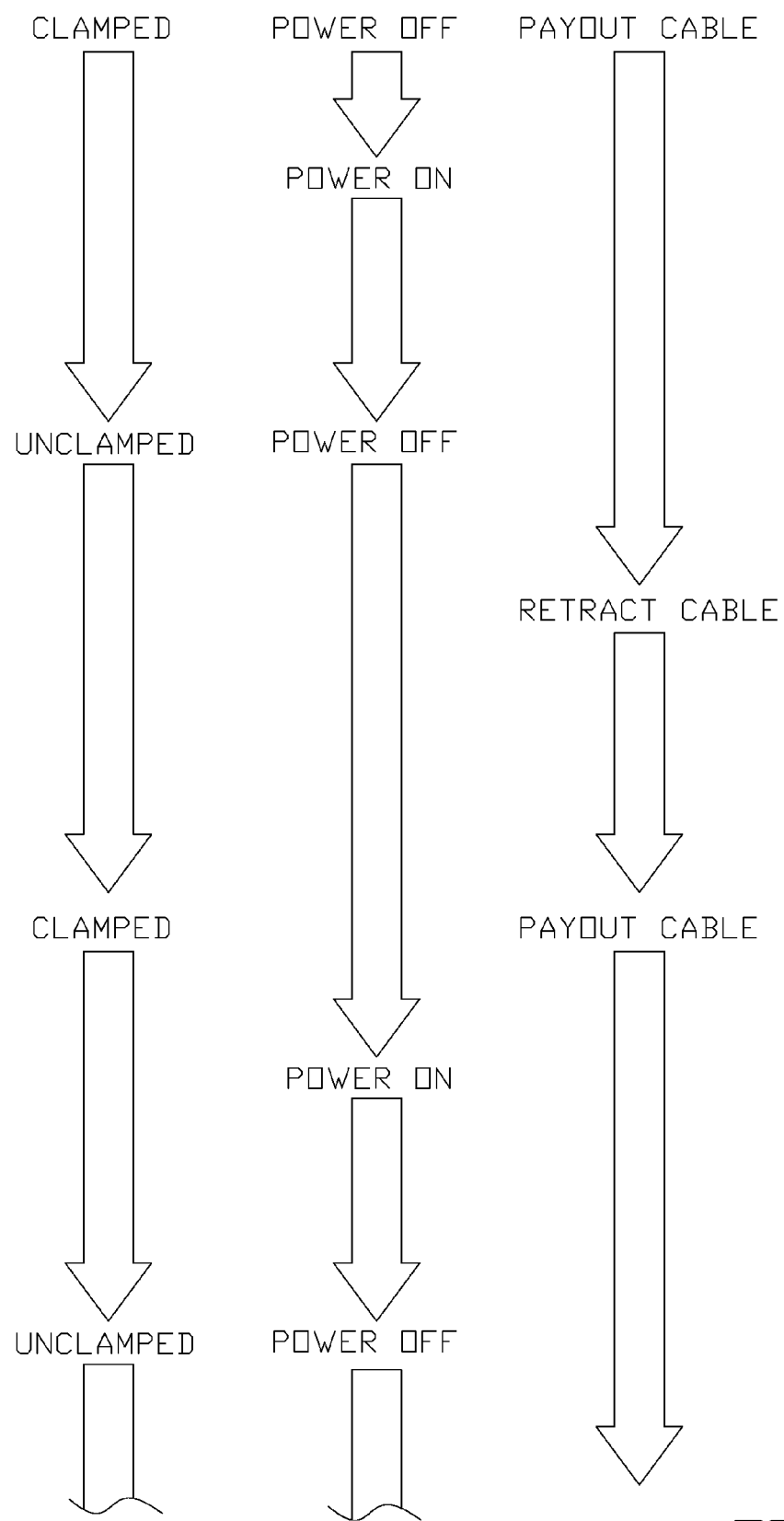
FIG. 3 is a simplified process flow diagram of a heating process wherein bi-directional rotation of a mandrel is used with one example of the apparatus of the present invention.

In other examples of the invention, connection of electrical power during rotation is provided by a cable reel or spool, and clamp contacts that apply power to the tubular heater's inner and outer conductor contacts while rotation causes payout of the power cable. While rotation of the tubular heater continues unidirectionally the power source is turned off, the contacts are opened (unclamped) and the cables retracted before re-clamping and cycling the power, for example, as illustrated in the process diagram in FIG. 3. Alternatively a pair of clamp contacts can be used for connection to each of the inner and outer conductor contacts with fixed length cables in a process wherein each one of the pair of clamp contacts is alternatively clamped (closed) to the inner or outer conductor contacts, and during the transition from one to another clamp contact in the pair of clamp contacts, both of the contacts are momentarily closed during the transition to maintain continuous current flow to the inner and outer electrical conductors.

In a particular process application mandrel rotation may be intermixed with fixed mandrel positioning for a period of time depending upon the application and the materials being cured or dried on the mandrel.

The electromagnetic field generated by current flow through the inner and outer conductors will be contained between the outer electrical conductor and inner electrical conductor, which will significantly reduce any external magnetic field (stray field) over that achievable with induction heating systems, and minimize crosstalk, or interference, with other electrical devices created by such stray fields. In alternative examples of the invention comprising a non-coaxial arrangement of conductors, a combination of electrical shielding and return bus placement are utilized to minimize stray fields as further described below.

While in the above examples of the invention both the inner and outer conductors of the tubular shaped heating apparatus 10 can be rotated during the heat treating cycle, in some examples of the invention, the inner electrical conductor 10b can be kept stationary, at least partially, if not totally for all of the heat treating cycle, for example, by providing an electrical rotating assembly for the electrical connection between the outer and inner electrical conductors.

Figure 4:
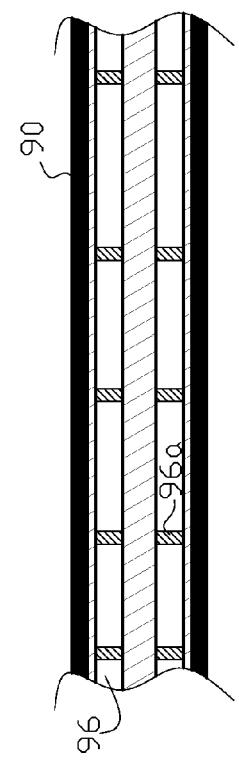
FIG. 4 is a partial cross section illustration of an optional noise reduction feature for a tubular mandrel used in the present invention.

As illustrated in FIG. 4 one or more discs 96a of suitable vibration damping material and construction can be transversely positioned in space 96 between the inner and outer electrical conductors to reduce noise generation or amplification from the tubular mandrel when it is rotated.

In use of the above apparatus of the present invention, the preform of article 90 may be applied to the outer surface of the mandrel by any method. For example the preform may be applied as a sheet to the mandrel; or sprayed or poured on to the mandrel as a liquid or a powder. If the preform of the article is substantially non-electrically conductive, such as but not limited to a polymer material, heat from the resistively heated mandrel will flow by conduction to the substantially non-electrically conductive material and through the material to heat the preform to form heat treated article 90. If the preform of the article is a composite material having one or more electrically conductive constituent materials, such as electrically conductive reinforcing fibers in a polymer matrix component, in addition to heat conduction from the resistively heated mandrel, the fibers within the material may also be heated by resistance heating from current flow through the mandrel provided that a sufficiently low electrical resistance path is formed between the mandrel and the fibers (or other electrically conductive constituent materials) in the preform composite material. Subsequent to completion of heat treatment of the preform to form the manufactured tubular article, the mandrel can be removed from its structural supports and the manufactured tubular article can be stripped off of the mandrel.

FIG. 5(*a*) through FIG. 5(*c*) further illustrate another non-limiting example of the present invention of forming a heat treated tubular article similar to that shown in FIG. 1 and FIG. 2. Electrical conductors 92a and 92b are provided from power source 92 to slip rings 16a and 16b. If cooling of the conductors or the mandrel is required the conductors may be hollow conductors wherein a fluid medium, such as water, is supplied and returned through the hollow passages in the conductors (or mandrel) from fluid medium equipment associated with power source 92.

One non-limiting example of the present invention can be used for manufacture of a tubular polymer article that may be reinforced with a fiber. Tubular electrical apparatus 10 is initially installed on a filament winding machine that helically wraps along the length of the outer electrical conductor 10a a plurality of fibers dipped in, for example, a hot melt polymer composition that is below set up temperature to assemble a preform of article 90 on the outer conductor (loaded mandrel). Apparatus 10, loaded with the preform of the article (loaded mandrel), is moved from the filament winding machine and locked into chuck assemblies 14 at its opposing ends so that a heating routine can be executed. A heating routine is defined as one or more heating stages during which a selected level of electric power is applied to apparatus 10 as it is rotated anywhere from zero revolutions per second (rps) to a selected maximum rps through at least a partial clockwise, or counterclockwise rotation of apparatus 10. In one non-limiting example of the present invention, the heating routine may consist of the following heating stages:

| Heating stage | Heating stage time (seconds) | Power level | Mandrel 360° rotational speed (rps) | Revolution (degrees) | Remarks |
|---|---|---|---|---|---|
| 1 | 10 | 1.0 max | 0 | 0 | |
| 2 | 0.075 | 0.75 max | 10 | 270 clockwise | Heating stages 2 and 3 are repeated sequentially 100 times each |
| 3 | 0.075 | 0.75 max | 10 | 270 counterclockwise | |

Electrical power at a suitable level, up to a maximum (max) rated output of the power supply and frequency (if ac), is supplied to apparatus 10 from power supply 92. Heat generated by resistive (joule) heating in longitudinally oriented outer electrical conductor 10a is transferred by conduction to the preform of the article on the mandrel to cure (or otherwise heat treat) the preform composite material and form the manufactured tubular article. As described above, if a constituent component of the preform is electrically conductive, the electrically conductive constituent of the preform may also be resistively heated by current flow from the outer electrical conductor and through the electrically conductive constituent of the preform.

When, as in the above heating routine, revolution of apparatus 10 for each heating stage is finite, slip rings, or other forms of electrical rotating assemblies can be eliminated, and electrical connections to apparatus 10 can be made directly to the mandrel by flexible electrical conductors with sufficient slack for free movement of the conductors through the partial revolution.

Repeated sequential rotation of apparatus 10 in opposing directions for a finite rotational distance enhances roundness uniformity of the outer diameter of the manufactured tubular article and facilitates drip off of any byproducts from the curing process. One benefit of achieving roundness uniformity within acceptable tolerance with the apparatus and process of the present invention is that it can avoid the necessity of further processing steps for truing and rounding within an acceptable tolerance.

In some examples of the invention, a computer processing system may be used to either semi automate, or completely automate the heating or curing process accomplished with the apparatus of the present invention. For example inputs to one or more computer processors may be: electric power, voltage and current magnitude to apparatus 10 from suitable transducers for sensing these parameters; temperature readings at various locations along the surface of the outer conductor from suitable temperature sensors; and temperature readings of the preform of the article on apparatus 10 from suitable non-contact temperature sensors. One or more electronic storage devices may be provided to store heating routines for selected preforms so that the stored data can be retrieved and applied by a heating routine program in the one or more processors to achieve a stored heating process routine with apparatus 10.

In a typical operation, a plurality of apparatus 10 (mandrels) would be used. For example one mandrel may be installed on each one of a plurality of filament winding machines; while different mandrels may be installed on each one of a plurality of manufactured article stripping stations for stripping the manufactured article off of a mandrel after the preform is cured (or otherwise heat treated). Further each one of the mandrels can be repeatedly used after the manufactured article is stripped off of the mandrel. Each mandrel develops a unique aging profile that can result in longitudinal or radial distortion of the mandrel, or non homogeneity of the material forming the mandrel may result in local hot stops on the outer conductor of the mandrel. These unique deformities of each mandrel will influence characteristics of the manufactured article, such as outer diameter roundness uniformity. The one or more processors can execute a program that evaluates one or more process inputs, such as those identified above, and modify the heating routine program execution for each unique mandrel. An operator may input the identity code of a particular mandrel, or each mandrel may be coded either mechanically or electronically so that when it is installed between a pair of opposing chuck assemblies, the identity code of a particular mandrel is automatically inputted to the one or more processors.

An alternative non-limiting example of the invention is shown in FIG. 6(a). In this example of the invention, in lieu of a return coaxial longitudinally oriented inner electrical conductor within outer longitudinally oriented electrical conductor 10a, a return outer electrical conductor 11b is positioned externally around mandrel electrical conductor 11a, upon which the preform of article 90 is loaded. Return bus bar 11b is electrically connected to an end of mandrel electrical conductor 11a as shown in FIG. 6(a) by a suitable form of electrically conductive rotating, brushing or clamping assembly 16c, or flexible cables, if oscillatory rotation of the mandrel is used instead of continuous unidirectional rotations.

Preferably, but not by way of limitation, the outer conductor is arranged to contain at least, in part, the electromagnetic field between the mandrel and the outer electrical conductor, either solely by arrangement of outer electrical conductor 11b, or the combination arrangement of the outer electrical conductor 11b and suitable electromagnetic shielding material.

For example as shown in FIG. 6(b) the outer conductor may comprise a discrete bus bar array distributed radially at least partially around inner conductor 11a. At least some portions of the bus bar array may be connected to a positioning apparatus that permits moving at least a portion of the bus bar array away from mandrel conductor 11a so that the mandrel can be removed from, or inserted in, its seated position between opposing chuck assemblies. For the example shown in FIG. 6(b) the bus bar array comprises in cross section two semicircular sheet conductors 11b' disposed on opposing sides around the mandrel conductor 11a. Positioning apparatus 94a can be provided to move outer conductors 11b' away from the mandrel (for example, to the positions shown in dashed lines) so that the mandrel can be removed from, or inserted within, chuck assemblies, or other rotational support structure, at opposing ends of the mandrel.

Alternatively as shown in FIG. 6(c) outer conductor 11b'' may comprise a moveable clamshell-shaped pair of longitudinally oriented sheet electrical conductors 11b'' that are hingeably attached to bus bar 11c, which runs along the length of mandrel conductor 11a. Positioning apparatus may be attached to each clamshell-shaped conductor and bus bar 11c to allow opening and raising of the clamshell (for example, as shown in dashed lines in FIG. 6(c)) for insertion, or removal, of a mandrel from within the chuck assemblies, or other rotational support structure, at opposing ends of the mandrel.

Alternatively as shown in FIG. 6(d), the outer conductor may comprise a pair of bus bar conductors 11b''' positioned on opposing sides of mandrel conductor 11a with electromagnetic shielding material 98a and 98b positioned above and below the bus bar conductors to substantially form an electromagnetic shielding cage around mandrel conductor 11a. Bus bars 11b''' may be fixed in position and at least upper shielding material 98a may be movable so that a mandrel can be removed from, or inserted, between the pair of bus bars and the opposing pair of chuck assemblies. The arrangement shown in FIG. 6(d) is of particular advantage when the outer conductors, bus bars 11b''' are kept stationary. Lower shielding material 98b may also serve as a gutter for drainage of liquid state byproducts from the curing (or other heating) process by either being open at its low point, as shown in FIG. 6(d), or closed and sloped along the length of the mandrel so that liquid byproducts settling in the lower shielding material 98b drain to one end of the shielding material.

Further if dc current is used with the examples of the invention shown in FIG. 6(a) through FIG. 6(d) and the material to be heated or cured on mandrel conductor 11a is, for example, a dipole polymer, the dc field between the inner and outer conductors can be used to pole the dipole polymer during the curing (or other heating) process.

If stray fields are not of concern in a particular installation, then, for example, one or more return bus bars may be suitably positioned anywhere relative to mandrel electrical conductor 11a. For example as shown in FIG. 7(a), FIG. 7(b) and FIG. 7(c), suitable electrical conductors 92a' and 92a" supply power from source 92 to a first end of mandrel electrical conductor 11a. Suitable electrical conductors 92b' and 92b" at the second opposing end of mandrel electrical conductor 11a connect to one or more return bus bars 11e that complete the return electrical connection to source 92. In this particular example, dual hollow passage electrical conductors are used at both ends of the mandrel electrical conductor to provide a cooling water supply and return path within the hollow passages of the dual conductors. If electromagnetic shielding is desired with this arrangement, the entire apparatus may be enclosed within a structure that serves as an electromagnetic shield.

In all examples of the invention the surface of the mandrel may be coated with a thin layer of material that exhibits high thermal conductivity. For example a friction reducing coating may be applied to the surface of the mandrel to facilitate removal of the manufactured article from the mandrel.

The present invention may be embodied in other specific forms without departing from the spirit or essential attributes thereof and, accordingly, reference should be made to the appended claims, rather than to the foregoing specification, as indicating the scope of the invention. The above examples of the invention have been provided merely for the purpose of explanation, and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects.

The invention claimed is:

1. An apparatus for heat-treatment of a tubular preform, the apparatus comprising:
   an outer longitudinally oriented first electrical conductor having an at least partially open interior, the outer longitudinally oriented first electrical conductor having a first end and a second end opposite the first end, the outer surface of the outer longitudinally oriented first electrical conductor forming a mandrel surface for the tubular preform;
   an inner longitudinally oriented second electrical conductor disposed within the outer longitudinally oriented first electrical conductor, the inner longitudinally oriented second electrical conductor having a first end, and a second end opposite the first end, the first end of the outer longitudinally oriented first electrical conductor electrically connected to the first end of the inner longitudinally oriented second electrical conductor to form a series electrical resistance between the second ends of the inner and outer longitudinally oriented first and second electrical conductors;
   a rotational support structure for support the opposing ends of the combination of the outer and inner longitudinally oriented first and second electrical conductors;
   an electric power supply having a first and second power supply outputs, the first power supply output connected near to the second end of the outer longitudinally oriented first electrical conductor, and the second power supply output connected near to the second end of the inner longitudinally oriented second electrical conductor; and
   a rotational driver attached to either the outer or inner longitudinally oriented first or second electrical conductor.

2. The apparatus of claim 1 wherein a first and second electrical rotating assembly respectively connects the first and second power supply outputs to the outer and inner longitudinal oriented first and second electrical conductors.

3. The apparatus of claim 1 further comprising at least one passage between the inner and outer longitudinally oriented first and second electrical conductors for flowing a liquid cooling medium through the at least one passage.

4. The apparatus of claim 1 wherein the resistivity of the outer longitudinally oriented first electrical conductor is at least 100 nano-ohm-meters and the resistivity of the inner longitudinally oriented second electrical conductor is no greater than 30 nano-ohm-meters.

5. An apparatus for heat-treatment of a tubular preform, the apparatus comprising:
   a longitudinally oriented electrical conductor having a first end, and a second end opposite the first end, the outer surface of the longitudinally oriented electrical conductor forming a mandrel surface for the tubular preform;
   at least one return electrical conductor disposed external to the longitudinally oriented electrical conductor, each of the at least one return electrical conductors having a first end and a second end opposite the first end, the first end of each of the at least one return electrical conductors electrically connected to the first end of the longitudinally oriented electrical conductor to form a series electrical resistance between the second ends of the longitudinally oriented electrical conductor and each of the at least one return electrical conductors;
   a rotational support structure for supporting the opposing ends of the longitudinally oriented electrical conductor;
   an electric power supply having a first and second power supply outputs, the first power supply output connected near to the second end of the longitudinally oriented electrical conductor, and the second power supply output connected near to the second end of each of the at least one return electrical conductors; and
   a rotational driver attached to the longitudinally oriented electrical conductor.

6. The apparatus of claim 5 further comprising at least one passage in the longitudinally oriented electrical conductor for flowing a liquid cooling medium through the at least one passage.

7. The apparatus of claim 5 wherein the resistivity of the longitudinally oriented electrical conductor is at least 100 nano-ohm-meters and the resistivity of the at least one return electrical conductor is no greater than 30 nano-ohm-meters.

8. The apparatus of claim 5 wherein the at least one return electrical conductor comprises a discrete bus bar array distributed radially at least partially around the exterior of the longitudinally oriented electrical conductor.

9. The apparatus of claim 5 wherein the at least one return electrical conductor comprises at least one moveable pair of longitudinally oriented clamshell-shaped sheet conductors disposed around the exterior of the longitudinally oriented electrical conductor.

10. The apparatus of claim 5 wherein the at least one return electrical conductor comprises at least one pair of bus bars disposed on opposing sides of the longitudinally oriented electrical conductor.

11. The apparatus of claim 10 further comprising an electromagnetic shield disposed between each of the at least one pair of bus bars around the exterior of the longitudinally oriented electrical conductor.

12. The apparatus of claim 4 wherein the outer longitudinally oriented first electrical conductor is formed from a carbon steel composition, stainless steel composition, titanium composition or nickel-chromium alloy, and the inner longitudinally oriented second conductor is formed from a copper composition, silver composition, or aluminum composition.

13. The apparatus of claim 1 wherein the first and second power supply outputs comprise a power cable stored on a cable reel and the first and second power supply outputs are respectively connected to the second ends of the outer and inner longitudinally oriented first and second electrical conductors by clamp contacts for clamping and unclamping from the second ends of the outer and inner longitudinally oriented first and second electrical conductors when the rotational driver rotates the outer or inner longitudinally oriented first or second electrical conductor.

14. The apparatus of claim 1 further comprising at least one passage between the inner and outer longitudinally oriented first and second electrical conductors and one or more vibration damping discs disposed within the at least one passage.

15. The apparatus of claim 1 wherein the outer longitudinally oriented first electrical conductor is rotated by the rotational driver while the inner longitudinally oriented second electrical conductor is kept stationary.

* * * * *